United States Patent [19]

Hoogesteger et al.

[11] Patent Number: 5,097,596
[45] Date of Patent: Mar. 24, 1992

[54] SUPERCALENDER ROLL AND METHOD OF MAKING SAME

[75] Inventors: James L. Hoogesteger; Wayne A. Damrau, both of Wisconsin Rapids, Wis.

[73] Assignee: Consolidated Papers, Inc., Wisconsin Rapids, Wis.

[21] Appl. No.: 432,556

[22] Filed: Nov. 7, 1989

[51] Int. Cl.[5] .............................................. B21D 53/00
[52] U.S. Cl. ................................ 29/895.21; 29/895.3; 29/132; 29/895.213
[58] Field of Search ................. 29/123, 125, 130, 132, 29/895.2, 895.21, 895.212, 595.213, 895.3, 843.33; 264/136, 162, 248; 162/358

[56] References Cited

U.S. PATENT DOCUMENTS

| | | | |
|---|---|---|---|
| 843,700 | 2/1907 | Rusden | 29/132 |
| 861,888 | 7/1907 | Perkuns | 29/895.213 X |
| 1,883,183 | 10/1932 | Weber | 29/132 X |
| 2,406,718 | 8/1946 | Thomas | 29/125 |
| 2,720,692 | 10/1955 | Long | 29/895.213 |
| 2,801,461 | 8/1957 | Kusters . | |
| 2,987,802 | 6/1961 | Quinn | 29/125 |
| 3,291,039 | 12/1966 | Christie | 100/162 |
| 3,336,866 | 8/1967 | Hawthorne | 29/132 X |
| 3,383,749 | 5/1968 | Wilkinson | 29/132 X |
| 3,511,729 | 5/1970 | Williams . | |
| 3,673,025 | 6/1972 | Iukuyama et al. . | |
| 3,711,913 | 1/1973 | Baleone et al. | 29/895.213 X |
| 3,763,533 | 10/1973 | Blom et al. | 29/132 |
| 3,814,054 | 6/1974 | Tajihi | 29/125 |
| 3,853,525 | 12/1974 | Gorman . | |
| 3,853,677 | 12/1974 | Kai | 29/125 X |
| 4,283,821 | 8/1981 | Paakkunainen | 29/129 |
| 4,352,230 | 10/1982 | Sukenik | 29/125 |
| 4,368,568 | 1/1983 | Watanabe | 29/130 |
| 4,466,164 | 8/1984 | Tadokoro et al. | 29/132 |
| 4,534,094 | 8/1985 | Kessler | 29/132 X |
| 4,604,778 | 8/1986 | Edwards | 29/123 |
| 4,650,454 | 3/1987 | Moll | 29/125 X |
| 4,669,163 | 6/1987 | Lux et al. | 29/125 |
| 4,730,374 | 3/1988 | Neuhoffer et al. | 29/130 |
| 7,892,013 | 11/1991 | Edwards | 29/895.213 |

*Primary Examiner*—Mark Rosenbaum
*Assistant Examiner*—Frances Chin
*Attorney, Agent, or Firm*—Juettner Pyle & Lloyd

[57] ABSTRACT

A filled supercalender roll is characterized by a plurality of resin impregnated discs that are carried side-by-side on a shaft and form a homogeneous roll body. To make the supercalender roll, a web of woven or nonwoven fibrous material is immersed in and carried through a vat of thermosetting resin to saturate the web with the resin. The resin saturated web is then transported through an oven to partially cure the resin to the B stage, after which the web is cut into a plurality of the discs. The discs are placed side-by-side on the shaft and a collapsible oven is assembled around the discs. The discs are then axially compressed while being heated within the oven to fully cure the resin to the C stage, during which time the collapsible oven decreases in length in accordance with a decrease in the axial length of the axially compressed discs on the shaft as the resin cures. Upon completion of curing of the resin, the discs are fused together and form the homogeneous roll body, which is then finish machined to provide a smooth cylindrical surface on the supercalender roll.

32 Claims, 4 Drawing Sheets

SUPERCALENDER ROLL AND METHOD OF MAKING SAME

BACKGROUND OF THE INVENTION

The present invention relates to calenders for finishing paper stock, and in particular to an improved filled supercalender roll and method of making the same.

It is common to use one or more pairs of calender rolls to process paper. The rolls have smooth surfaces and a paper web is fed into a nip or nips therebetween, with the resultant compression of the paper and smoothing of its surface imparting a gloss to the surface. The rolls may be made of metal such as steel, but a pair of metal rolls often will not provide satisfactory operation when relatively thin paper is calendered. Because of slight variations in the concentricities of the rolls and/or as a result of slight variations in the thickness of the paper web, substantial differences in pressure are applied to various portions of the passing web. Some parts of the web therefore receive insufficient pressure from the rolls for adequate smoothing of the web surface, while other parts receive too much pressure which results in excessive compacting of the web and a decrease in its opacity.

To overcome the disadvantages of calendering using metal rolls only, a supercalender often is used. A supercalender has a plurality of vertically stacked metal rolls between which are composition or filled supercalender rolls that form nips with the metal rolls. Supercalender rolls commonly have a roll body formed by compressing together discs of fibrous material such as cotton, paper or the like, that are in side-by-side relationship on a shaft. The surface of the roll body is finish machined so that it is smooth and cylindrical.

The metal rolls of a supercalender may be heated to obtain desired results, and in the calendering operation such direct heat and/or heat from friction or other causes heats the supercalender rolls. The weight of the rolls, which is usually augmented by additional force, causes an indentation in the supercalender rolls at the nips formed with the metal rolls, resulting in a speed differential in the nips between the surfaces of the filled supercalender and metal rolls. The paper web to be supercalendered is fed through the nips, so that the sliding, frictional polishing action caused by the speed differential produces a high gloss on the surface of the paper.

The resilience of a supercalender roll produces a fairly equal pressure across the width of the paper web, thus eliminating the problems encountered in using metal rolls only. Such resilience is a matter of degree, and while the surface of the supercalender roll is hard, it is substantially more resilient than the surface of a metal roll. In order to first permit the removal of imperfections such as wrinkles or tears from the paper web, which can damage the surface of the supercalender roll, supercalenders are not normally used in line with paper machines. Even when used off line, however, it often happens that web imperfections damage the surface of the supercalender roll.

In addition to the surface of a conventional supercalender roll being susceptible to damage by imperfections in the paper web, another problem is its inability to withstand high nip temperatures, particularly those due to uneven loading in the nip and the shock impact of being repeatedly compressed by metal rolls. Cotton and paper fibers on the supercalender roll disintegrate in this environment, just beneath the roll surface, leading to a condition known as "burning." The burning of the roll body causes its surface to become uneven and cracked, so that the roll is rendered unfit for service. The supercalender roll must then be removed from the calender stack for remachining to remove such defects, whether caused by burning or marking due to imperfections in the paper web or foldovers due to web breaks. Consequently, there is an ever occurring need for refinishing, which is an expensive and time consuming operation.

Previous efforts to improve the life of filled supercalender rolls have included water cooling their shafts, making their filling from asbestos, either alone or in conjunction with cellulose, and using so-called heat resistant fibers, e.g., ramie in conjunction with cellulose. Such expedients have helped, but have not satisfactorily solved the problem.

OBJECTS OF THE INVENTION

An object of the present invention is to provide a filled supercalender roll which is economical to make, will not readily be damaged or marked by imperfections in a paper web or foldovers on web breaks and will not readily deteriorate from heat and compressive forces.

Another object is to provide such a supercalender roll which will produce on a web gloss equivalent to or better than that produced with conventional filled supercalender rolls.

A further object is to provide such a supercalender roll, the body of which is formed from resin impregnated discs of a fibrous fill material which, when the resin is cured, form a homogeneous roll body.

Yet another object is to provide a method of making such a supercalender roll.

SUMMARY OF THE INVENTION

In accordance with the present invention, a supercalender roll comprises a roll core shaft and a resilient and homogeneous roll body on the shaft. The roll body has a smooth outer cylindrical surface, and is comprised of a plurality of resin saturated fiber discs in side-by-side axially compressed relationship on the shaft, with the resin being cured while the discs are maintained in compressed relationship on the shaft so that the discs form the homogeneous roll body.

The invention also contemplates a method of making a supercalender roll, which comprises the steps of providing a plurality of fiber discs saturated with a thermosetting resin cured to the B stage, the discs having an axial opening; assembling the discs in side-by-side relationship on a shaft with the shaft extending through the axial openings in the discs; axially compressing the discs on the shaft; heating the discs while the same are axially compressed on the shaft to cure the resin to the C stage and fuse the discs together to form a substantially homogeneous roll body on the shaft; and machining the roll body to have a smooth outer cylindrical surface.

The foregoing and other objects, advantages and features of the invention will become apparent upon a consideration of the following detailed description, when taken in conjunction with the accompanying drawings.

DETAILED DESCRIPTION

Figure 1:
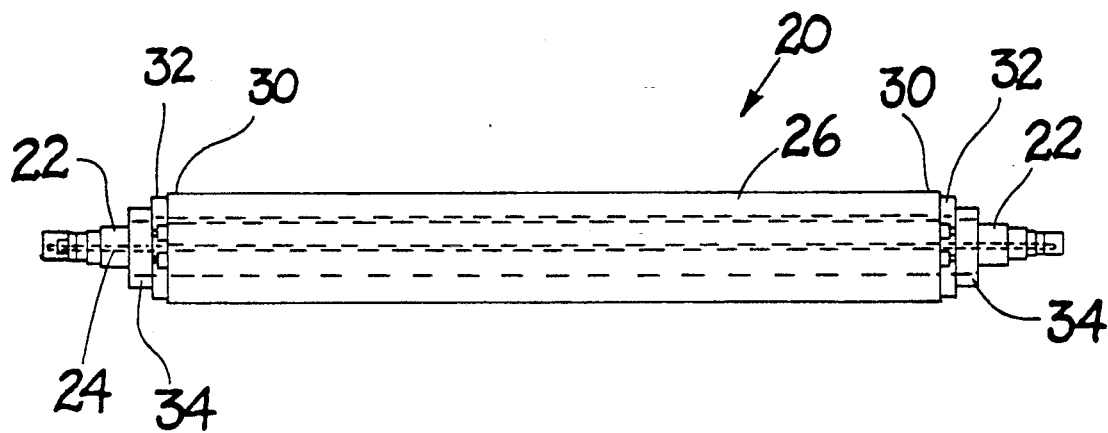
FIG. 1 shows a supercalendar roll embodying the teachings of the invention.
Figure 2:
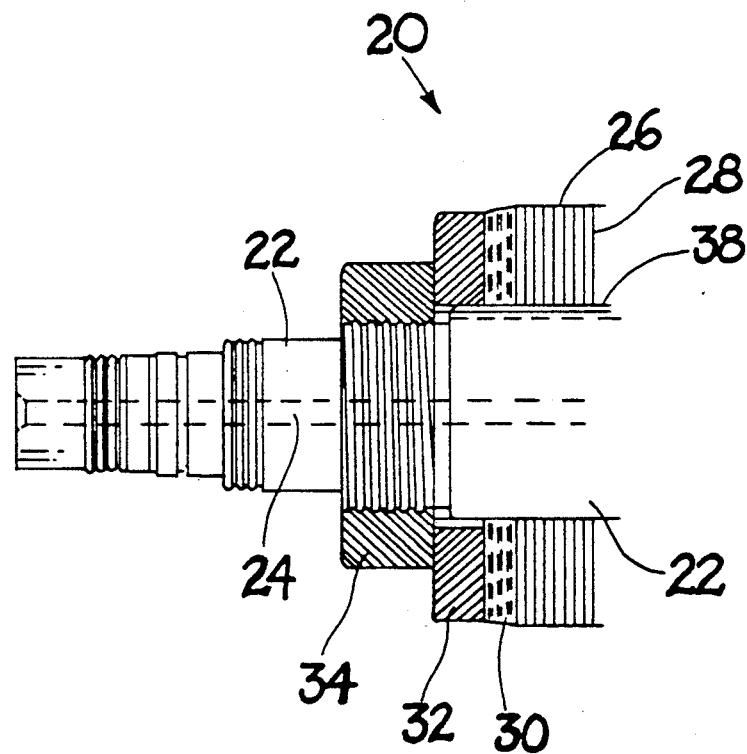
FIG. 2 is a cross sectional side end view of the supercalendar roll.

FIGS. 1 and 2 illustrate a filled supercalender roll, indicated generally at 20, according to the teachings of the invention. The supercalender roll includes a roll core shaft 22 having an axial passage 24. Carried on the shaft is a homogeneous roll body 26 comprising a plurality of side-by-side resin impregnated axially compressed discs 28 which form the homogeneous roll body. Also on the shaft at each end of the roll body is a cap 30 of cotton fill material, a steel roll head 32 and a locking nut 34 that bears against the roll head. The locking nuts are tightened to maintain on the roll body compression forces that are exerted thereon during manufacture of the roll, as will be described, and the caps act as cushions between the roll heads and roll body. Although for the purpose of illustration the roll body in FIG. 2 is shown as comprising individual discs, it is to be understood that as fully manufactured the roll body is homogeneous.

Figure 3:
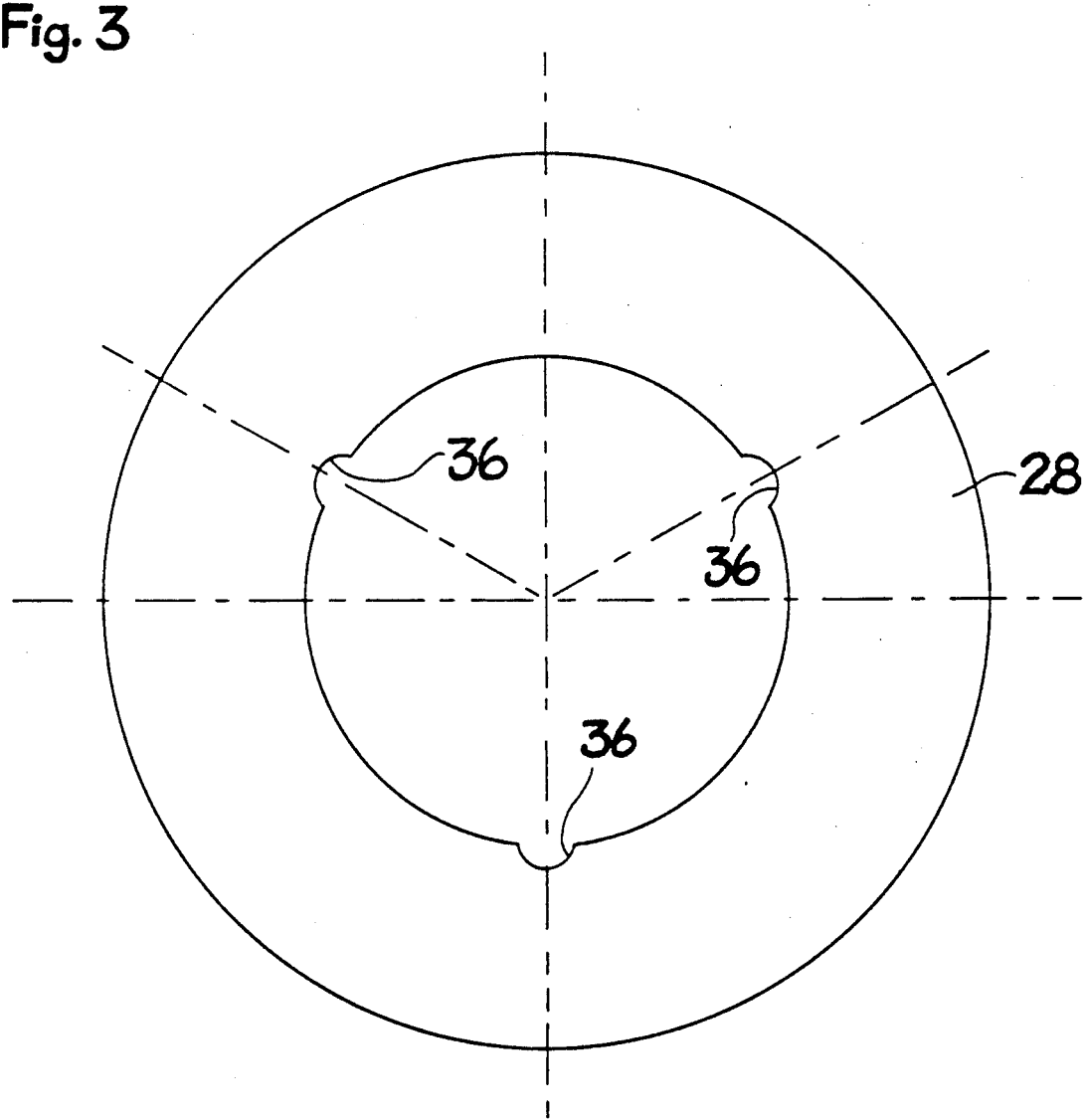
FIG. 3 illustrates the configuration of discs used in making the roll.

In a contemplated embodiment, the discs 28 are made from a web of saturating kraft paper. The web is immersed in and carried through a vat of phenolic, melamine or other thermosetting resin to saturate the web with resin as completely and uniformly as possible. The resin saturated web is then transported through an oven to partially cure the resin to what is known as the "B" stage, after which the web is cut into discs, such as the disc 28 shown in FIG. 3. The discs are cut to have an outside diameter that is greater than the final diameter of the roll body 26 to accommodate finish machining of the roll body to have a smooth outer cylindrical surface. The discs are for being placed on the roll core shaft 22, and are therefore also cut to have an axial opening of a diameter approximately equal to the diameter of the shaft and to provide in the opening three semi-circular key reliefs 36 that receive respective keys 38 extending longitudinally along the surface of the shaft.

The kraft paper used to make the discs 28 may be either bleached or unbleached. It is also contemplated that other fibers, both natural and synthetic, be used for the discs. Some natural fibers that could be used are cotton, wool, wood fiber and linen. Synthetic fibers could comprise rayon, dacron, fiber glass, graphite, aramid, ceramic, silica, carbon, nylon, Teflon and combinations of the same. It is also contemplated that thermosetting resins other than phenolic and melamine could be used to saturate the discs, the primary requirement being that the resin, when cured, provides a homogeneous roll body 26, the surface of which has a sufficient hardness, advantageously in the order of 83-95 Shore D.

Figure 4:
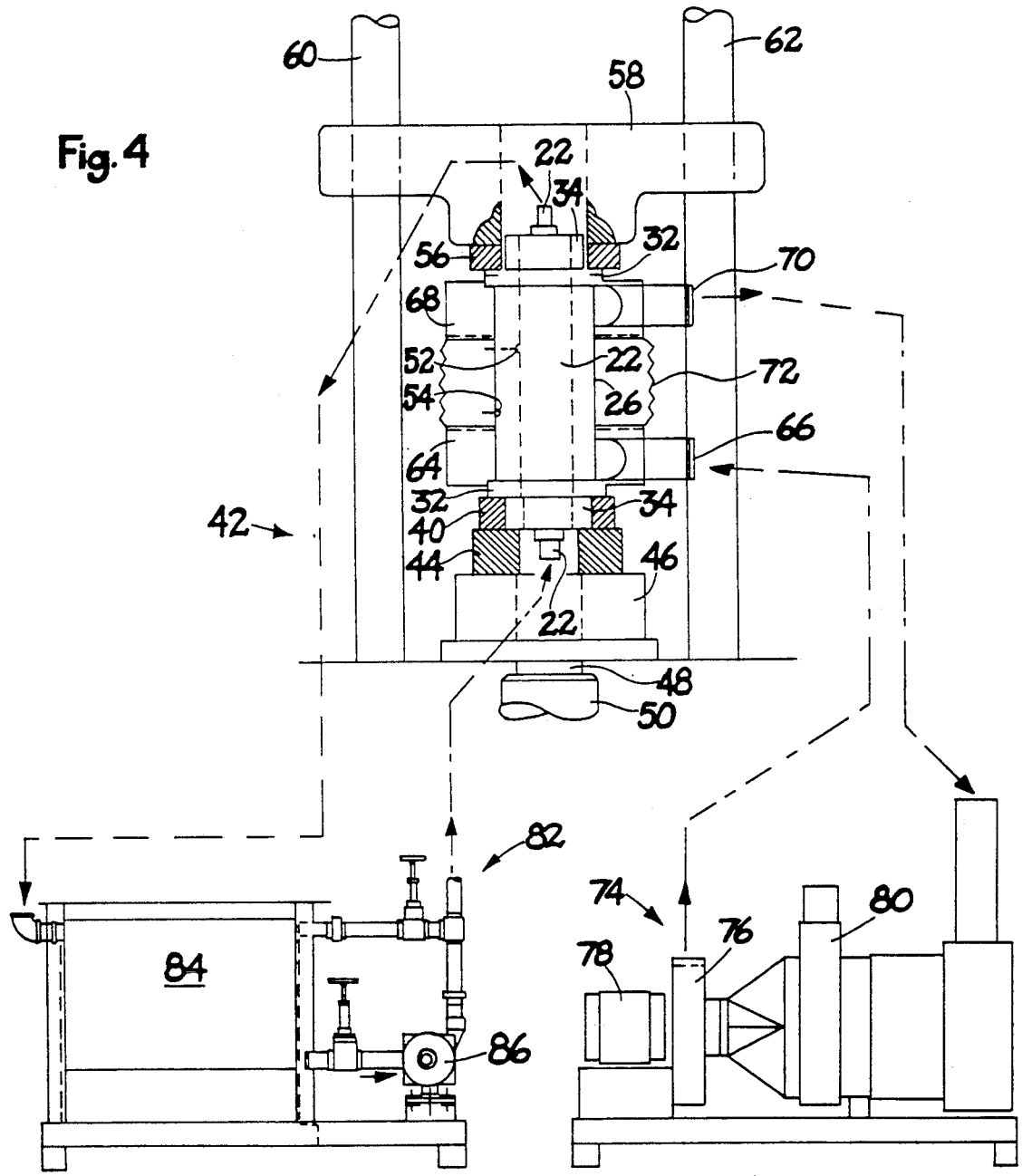
FIG. 4 shows an apparatus used in making the roll.

FIG. 4 illustrates an apparatus for use in making the supercalender roll 20. To make the supercalender roll, a roll head 32 and a locking nut 34 are assembled onto one end of the roll core shaft 22 and the shaft is placed in an upright or vertical position with the roll head being at the lower end of the shaft and resting on a support 40 of a hydraulic press 42, which is typical of the type used to fill conventional supercalender rolls. The support 40 is carried on a support 44, on which rests the locking nut and which in turn is carried on a press table 46. The press table is vertically movable by a ram 48 of a hydraulic cylinder 50.

With the roll core shaft 22 positioned vertically on the press support 40 a cap 30, comprising about a 2" thickness of discs of cotton fill material, is loaded onto the upper end of the shaft and slid down to the lower roll head 32. The cap, which ultimately will be compressed to approximately ½" thick, serves as a cushion between the roll head and roll body 26 to be formed above it.

Next, a portion of the total number of resin saturated discs 28 that will ultimately form the homogeneous roll body 26 are loaded onto the upper end of the roll core shaft 22 and hand rammed downward onto the shaft, with the key relief areas 36 in the discs receiving the keys 38 on the shaft. During hand loading of the discs onto the shaft, a plurality of thermocouples are inserted between adjacent discs at selected locations, such as a thermocouple 52 toward the inside diameter of the discs and a thermocouple 51 toward the outside diameter. The thermocouple monitor the plastic temperature of the resin in the discs during final curing, which resin at this point is cured only to the B stage. After hand loading approximately ⅓ of the estimated total number of discs, the upper roll head 32 is placed on the shaft. A pressing collar 56 and a press cross head 58, carried on a pair of press columns 60 and 62 of the press 42, are above the upper roll head, and the discs are then subjected to a preliminary pressing by operating the hydraulic cylinder 50 to raise the press table 46 and move the upper roll head against the pressing collar. The preliminary pressing packs down the discs on the shaft to make room for additional discs.

After the preliminary pressing, the hydraulic cylinder 50 is operated to lower the press table 46, the upper roll head 32 is removed from the roll core shaft 22 and the remaining resin impregnated discs 28 are hand loaded onto the shaft, with any additional thermocouples then being inserted between the discs. Since the "free height" of the unpacked discs is considerably greater than their compressed and cured height, a filling sleeve (not shown) comprising a steel tube with an outside diameter equal to that of the shaft is placed on the upper end of the shaft and some of the remaining discs, which ultimately are pressed downwardly onto the shaft, are loaded onto it. When the estimated total number of discs have been placed on the roll core shaft and filling sleeve, an upper cap 30, comprising about a 2" thickness of discs of cotton fill material, is put in place. Since it is difficult to estimate exactly the free height of the discs that is required to obtain a desired compressed and cured height, a sheet of aluminum foil is usually placed between the uppermost disc and upper cap. In this manner, if the number of discs is underestimated and it is determined, as curing progresses, that additional discs are required to yield a desired axial length of the roll body 26, it is possible to stop the curing process, disassemble the equipment and add additional discs, with the aluminum foil permitting separation of the upper cap from the uppermost disc. The upper roll head 32 is then placed on the upper cap.

A "collapsible" oven is then secured to the upper and lower roll heads 32 and around the resin impregnated discs 28 that will form the roll body 26 on the roll core shaft 22. The collapsible oven includes a bottom oven header 64 that is fastened to and around the periphery of the lower roll head and has an air inlet 66, and a top oven header 68 that is fastened to and around the periphery of the upper roll head and has an air outlet 70. The oven also includes a flexible jacket 72 extending between and attachable to the bottom and top oven headers. The flexible jacket may comprise a flexible hose with a spiral wire wound within it, and with the flexible jacket attached to the bottom but not the top oven header, the hydraulic cylinder 50 is operated to subject the discs to a desired axial compression force, usually from 800 to 2200 psi and preferably from 1800 to 2200 psi. Leaving the flexible jacket detached from the top oven header at this time enables the pressing action to be observed, so that a determination can be made whether additional discs need to be added onto the shaft. If additional discs are required, they are loaded onto the shaft before proceeding. If it appears that additional discs are not required, then the flexible jacket is attached to the top oven header.

Means are then connected to the collapsible oven and roll core shaft 22 to heat the discs 28 and resin therein from the B stage where the resin is partially cured, to the C stage where it is fully cured. The means includes an air heating unit 74, which has a blower 76 driven by a motor 78 and a heating coil 80. An outlet from the blower is connected through a hose to the inlet 66 to the bottom oven header 64, and the outlet 70 from the top oven header 68 is connected through a hose to an inlet to the air heating unit upstream from the heating coil 80, for recirculation of heated air through and between the air heating unit and collapsible oven. The heating means also includes a heating unit 82, which includes a tank 84 within which a suitable heat transfer media, such as glycerine, is heated, and a motor driven pump 86. An outlet from the pump is connected through a hose to the lower end of the shaft passage 24 and the upper end of the passage is connected through a hose to an inlet to the tank.

The air heating unit 74 is then turned on to begin circulating heated air to and from the collapsible oven, usually at a temperature in the order of about 250° F. to 300° F., and preferably from about 265° F. to 280° F., with the temperature being sensed and controlled by means of a thermocouple located in the inlet 66 to the bottom oven header 64. At the same time, the heating unit 82 also is turned on to circulate heated glycerine to and through the roll core shaft passage 24, at a temperature in the range of from about 200° F. to 300° F. and preferably at a temperature of about 250° F. The resin impregnated discs are thereby heated from the outside by the heated air and from the inside by the heated glycerine, via heat transfer through the roll core shaft to the discs, to cure the resin. The technique shortens the cure time and promotes a more uniform cure.

As curing of the resin progresses, the axial length or stack height of the resin impregnated discs 28 decreases, with the flexible jacket 72 collapsing to accommodate the decrease in height of the stack and resultant movement together of the bottom and top oven headers 64 and 68. During curing of the resin, the pressure exerted by the hydraulic press 42 on the stack of discs is maintained at a selected value in the range of from about 800 to 2200 psi, and preferably in the range of from about 1800 to 2200 psi. If the pressure is manually controlled, decreases in the height of the stack of discs during curing cause decreases in the compression force, so an operator must continually monitor the force and occasionally start the press to restore it. Advantageously, the press is automatically controlled to maintain a constant compression force on the stack of discs throughout the curing process.

To ensure complete curing of the resin impregnated discs 28 to the C stage, the discs are brought to a temperature of at least 250° F., as determined by means of the thermocouples embedded between the discs, and held at the temperature for 1-2 hours. However, the time for which the discs are maintained at the temperature can vary, depending upon the particular temperature to which the discs are heated. After curing is complete, the glycerin heating unit 82 is shut off and the heating coil 80 of the air heating unit 74 also is shut off, but the blower 76 is left running to circulate ambient air through the flexible oven for 15-30 minutes to promote cooling.

Another way to determine when curing of the resin impregnated discs 28 is complete is by monitoring the stack height or axial length of the stack of discs. When the height stops decreasing during curing, it is a good indication that curing is complete. Heating is then continued for approximately 15-30 more minutes, following which unheated air is circulated through the collapsible oven for another 15-30 minutes or longer to promote cooling.

The axial compression force exerted on the stack by the hydraulic press 42 is maintained until the roll has cooled down to near ambient temperature. At that time, and before relieving the force exerted by the press, the upper locking nut 34 is tightened to maintain compression on the roll body 26 after the roll is taken out of the press. For greater stability of the roll body, the locking nut is tightened to exert axial compression forces in the order of about 3800 psi to 4700 psi on the roll body. The collapsible oven is then disassembled from around the roll, the roll is removed from the press and the surface of the roll body is finish machined to be smooth and cylindrical. The machining process removes the thermocouples positioned near the outer diameter of the discs, while the others simply remain in place. Readings are then taken of the hardness of the resilient roll body surface to ensure that it is within a range of from about 83-95 Shore D, and preferably in a range of from about 90-95 Shore D.

Figure 5:
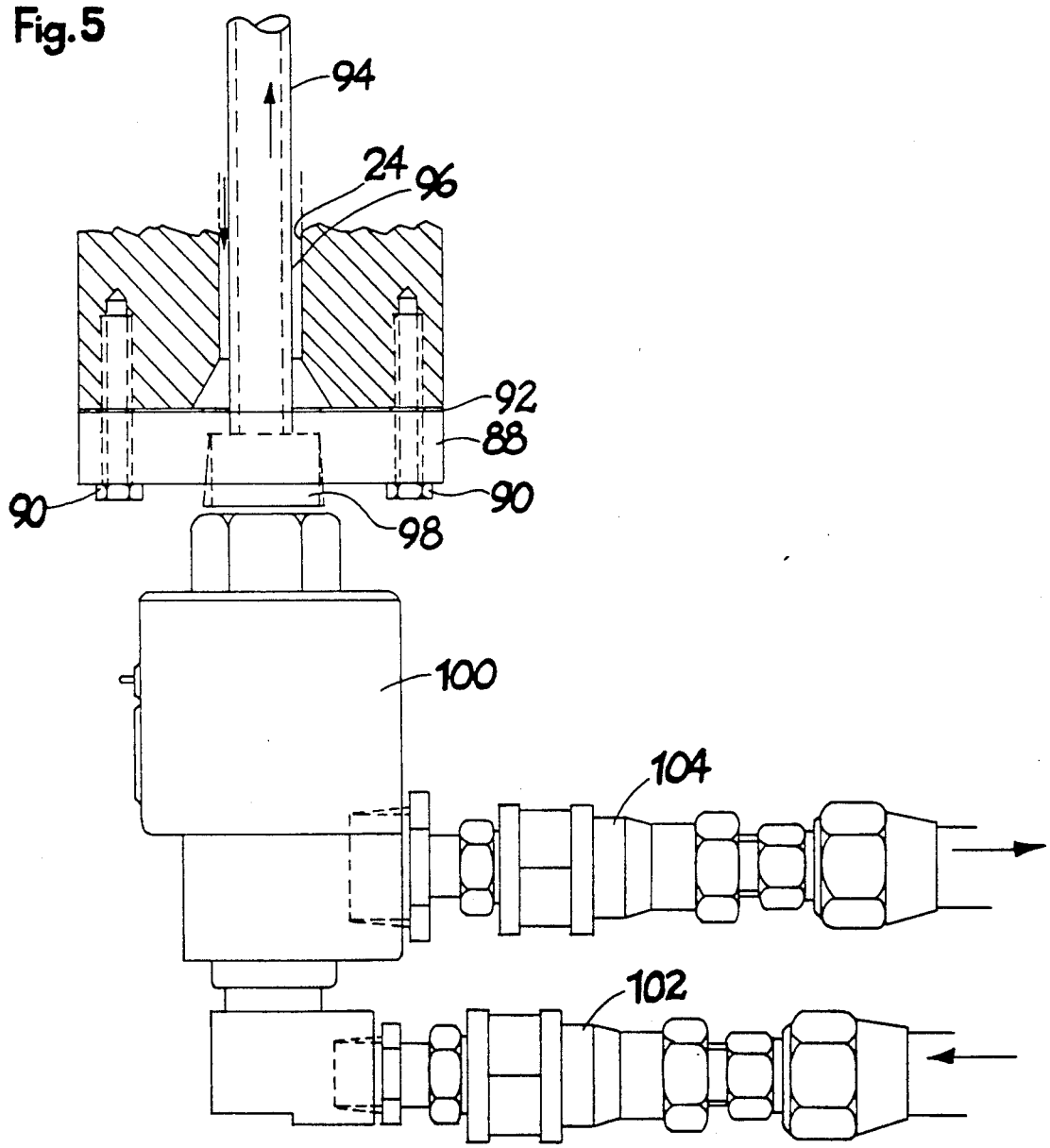
FIG. 5 an alternate embodiment of a portion of the apparatus of FIG. 4.

FIG. 5 illustrates an alternate structure for flowing heated glycerin through the passage 24 in the roll core shaft 22 to heat the shaft and thereby the interiors of the discs 28. Opposite ends of the roll core shaft have a reduced diameter, and a round plate 88 is attached to the shaft lower end by fasteners 90, with a seal 92 forming a fluid tight connection between the plate and shaft. The plate is centrally apertured for extension of a tube 94 through the plate and into the shaft passage. The tube has a length substantially equal to that of the shaft, and on and along its outer surface are three or more projections (not shown) that abut the shaft passage wall to maintain the tube coaxial with the passage and define an annular space 96 between the tube and passage. The aperature through the plate is internally threaded for receiving a fitting 98 of a rotary union 100, and a fluid inlet coupling 102 and a fluid outlet coupling 104 are connected to the union. The coupling 102 connects to the outlet from the pump 86, and the coupling 104 connects to the inlet to the tank 84, of the heating unit. A plate (not shown) is also fastened to and sealed with an upper end of the roll core shaft, but unlike the lower plate 88, the upper plate is not centrally aperatured, whereby it closes the upper outlet end of the shaft passage. Consequently, when the heating unit is turned on, heated glycerin flows into the coupling 102 and through the union 100 and fitting 98 into and upwardly through the tube 94 to the upper end of the shaft passage 24, whereat it exits the tube and flows downwardly through the annular space 96 in the shaft passage to and through the fitting, union and coupling 104 for return to the heating unit tank 84. The arrangement facilitates manufacture of the supercalender roll 20 with the apparatus of FIG. 4 by eliminating the need to connect a hose to the upper end of the shaft passage, which hose can interfere with placement of discs on the shaft. The plates are removed from opposite ends of the roll core shaft after the supercalender roll body 26 is fully cured and cooled and the roll is removed from the hydraulic press 42.

Although in describing the method of making the supercalender roll 20, reference was made to the stack of discs 28, upon completion of curing of the resin there no longer are any separate and distinct discs. Rather, the discs, which originally were separate and distinct, are fused together and form the substantially homogeneous roll body 26. The discs cannot be pried apart at their interfaces, and there is no detectible difference between the material within the discs and that at their interfaces where they are fused together. If there were differences in the material comprising the discs and any material between them, the roll would not be suitable for supercalendering, since it would leave an unacceptable pattern of machine direction marks on the finished paper.

While the supercalender roll 20 preferably has a hardness in the range of 90–95 Shore D, its hardness should not be significantly above that range, since it would then be sufficiently hard that it would perform much like a metal calender roll. Also, the roll should not be heated for too long after the resin is cured, since extended heating can cause the resin to become crystalline and brittle.

In use in a supercalender, the resin impregnated supercalender roll 20 will be subjected to temperatures in the order of 150° F. to 210° F. and higher, at which it maintains its strength with no appreciable softening or deforming. During a test of such a supercalender roll, it was found that its hardness dropped only from 95 to 94 Shore D in heating from room temperature to 176° F. The supercalender roll also is capable of being used at high nip pressures with a steel roll, and has been tested at 1600 pli and a nip pressure of 12,800 psi, based upon a ⅛" nip width.

An advantage of the supercalender roll of the invention is that it is more durable than a supercalender roll of conventional construction. It also provides better glossing of paper at lower nip pressures than do conventional cotton-filled rolls. In addition, it is not as subject to overheating and consequent "blow out" failure as are conventional rolls, which is believed to be due to the fact that the resin holds the internal fibers more securely, thereby reducing interfiber movement, friction and a resulting heat build-up as the roll turns under heavy loading. Also, during curing, resin forced from the resin saturated discs enters and fills any voids between the discs and the roll core shaft, thus securing the roll body to the shaft when curing is complete to eliminate the possibility of barreled rolls. A further advantage is that the supercalender roll is less susceptible to marking and damage, as can happen to cotton-filled rolls when imperfections in or multiple thicknesses of paper or other materials pass through the nip. The supercalender roll therefore does not have to be refinished as often as do conventional cotton-filled rolls.

While embodiments of the invention have been described in detail, various modifications and other embodiments thereof may be devised by one skilled in the art without departing from the spirit and scope of the invention, as defined in the appended claims.

What is claimed is:

1. A method of making a supercalender roll, comprising the sequential steps of providing a plurality of fiber discs, each disc having an axial opening and being saturated with a resin that is not fully cured, in side-by-side relationship on a shaft with the shaft extending through the axial openings; axially compressing the discs on the shaft; curing the resin while the discs are maintained axially compressed on the shaft to fuse the discs together to form a substantially homogeneous roll body; and imparting a smooth outer cylindrical surface to the roll body.

2. A method as in claim 1, including the step, after said curing and prior to said imparting step, of affixing the roll body in its axially compressed condition.

3. A method of making a supercalender roll, comprising the steps of providing a plurality of fiber discs saturated with a partially cured thermosetting resin, each disc having an axial opening; placing the discs in side-by-side relationship on a shaft with the shaft extending through the axial openings; axially compressing the discs on the shaft; heating the discs while the discs are axially compressed to fully cure the resin and fuse the discs together to form a substantially homogeneous roll body on the shaft; and imparting a smooth outer cylindrical surface to the roll body.

4. A method as in claim 3, wherein said axially compressing step comprises placing the discs and shaft in a press and operating the press to axially compress the discs on the shaft with a pressure in the range of about 800–2200 psi, and performing said heating step while the discs and shaft are in the press.

5. A method as in claim 4, including the step, after said heating step and prior to said imparting step, of affixing the roll body in its axially compressed condition, so that the roll body continues to be axially compressed after removal from the press.

6. A method as in claim 3, wherein the resin is of a type such that said heating step forms the roll body to have a surface hardness in the order of about 83–95 Shore D.

7. A method as in claim 3, wherein said heating step comprises assembling an oven around the shaft and discs, and flowing heated air through the oven.

8. A method as in claim 7, wherein the shaft has a passage extending longitudinally therethrough, and said heating step further comprises flowing a heated fluid through the passage.

9. A method as in claim 7, wherein the axial length of the resin saturated and axially compressed discs on the shaft decreases as the discs are heated and the resin cures, and including the step of maintaining selected axial compression forces on the discs as the axial length of the discs decreases.

10. A method as in claim 9, wherein the oven has an axial length substantially equal to the axial length of the axially compressed discs on the shaft, and including the step of decreasing the axial length of the oven in accordance with decreases in the axial length of the discs during curing of the resin.

11. A method as in claim 3, wherein said providing step comprises providing a plurality of fiber discs saturated with a resin selected from the group consisting of phenolics and melamines.

12. A method as in claim 3, wherein said providing step comprises providing a plurality of resin saturated kraft paper discs.

13. A method as in claim 19, said providing step comprising providing a plurality of discs, saturated with the resin, wherein the discs are of a material selected from the group consisting of cotton, wool, wood fiber and linen.

14. A method as in claim 19, said providing step comprising providing a plurality of discs, saturated with the resin, wherein the discs are of a material selected from the group consisting of rayon, dacron, fiber glass, graphite, aramid, ceramic, silica, carbon, nylon and Teflon.

15. A method of making a supercalender roll, comprising the steps of providing a plurality of fiber discs saturated with a partially cured thermosetting resin, each disc having an axial opening; assembling a first roll head and a first locking nut on one end of a roll core shaft; loading a plurality of the discs onto the opposite end of the shaft with the shaft extending through the axial openings in the discs, to place the discs in side-by-side relationship on the shaft; assembling a second roll head onto the opposite end of the shaft; assembling an oven around the discs on the shaft; forcefully urging the first and second roll heads relative to and toward each other to axially compress the discs on the shaft and between the roll heads; operating the oven to heat the discs while the discs are axially compressed on the shaft to fully cure the resin saturating the discs and fuse the discs together to form a substantially homogeneous roll body on and bonded to the shaft; after completion of curing of the resin, assembling a second locking nut on the opposite end of the shaft to maintain the roll body axially compressed between the first and second roll heads; and imparting a smooth outer cylindrical surface to the roll body.

16. A method as in claim 15, including the steps, following said forcefully urging step, of loading onto the shaft any additional discs as may be necessary to obtain a desired axial length of the roll body and, if additional discs are loaded onto the shaft, reperforming said forcefully urging step.

17. A method as in claim 15, wherein said forcefully urging step is performed with a hydraulic press and subjects the discs to pressures in the range of about 800–2200 psi.

18. A method as in claim 15, wherein the shaft has a passage extending longitudinally therethrough, and including the step of flowing a heated fluid within the shaft passage concurrently with performance of said step of operating the oven.

19. A method as in claim 18, wherein said flowing step comprises flowing through the shaft passage fluid heated to a temperature in the range of about 200° F. to 300° F.

20. A method as in claim 15, wherein said step of assembling the oven comprises attaching an oven inlet header to one of the roll heads, an oven outlet header to the other roll head and an oven jacket to and between the headers in surrounding relationship to the discs on the shaft, said operating step comprising flowing heated air into the inlet header for flow through the jacket to and from the outlet header.

21. A method as in claim 20, wherein the axial length of the resin saturated discs on the shaft decreases as the axially compressed discs are heated and the resin cures, and said step of assembling an oven comprises attaching an expansible and compressible oven jacket to and between the inlet and outlet headers, so that the length of the jacket decreases in response to decreases in the axial length of the discs and movement together of the roll heads and headers.

22. A method as in claim 20, wherein said oven operating step comprises recirculating heated air between the outlet and inlet headers.

23. A method as in claim 15, wherein said step of operating the oven comprises flowing through the oven air heated to a temperature in the range of about 250° F. to 300° F.

24. A method as in claim 15, including the steps of sensing the temperature of the discs on the shaft during said step of operating the oven, and terminating said oven operating step after a selected time following the sensed temperature reaching at least a predetermined value.

25. A method as in claim 24, wherein said temperature sensing step comprises sensing the temperature of the discs with at least one thermocouple positioned between an adjacent pair of discs.

26. A method as in claim 24, wherein said temperature sensing step comprises sensing the temperature of the discs with at least two thermocouples positioned between adjacent pairs of discs, at least one of which is toward the shaft and at least another of which is toward the outer circumference of the discs.

27. A method as in claim 15, wherein the axial length of the resin saturated and axially compressed discs on the shaft decreases as the discs are heated and the resin cures, and including the steps of determining when the axial length of the discs ceases to decrease during performance of said oven operating step, and terminating performance of said oven operating step a selected time thereafter.

28. A method as in claim 15, wherein the resin is of a type such that upon full curing of the resin the roll body has a surface hardness in the order of about 83–95 Shore D.

29. A method as in claim 15, wherein said providing step comprises providing fiber discs saturated with a resin selected from the group consisting of phenolics and melamines.

30. A method as in claim 15, wherein said providing step comprises providing resin saturated kraft paper discs.

31. A method as in claim 15, wherein said providing step comprises providing discs, saturated with a resin, wherein the discs are of a material selected from the group consisting of cotton, wool, wood fiber and linen.

32. A method as in claim 15, wherein said providing step comprises providing discs, saturated with a resin, wherein the discs are of a material selected from the group consisting of rayon, dacron, fiber glass, graphite, aramid, ceramic, silica, carbon, nylon and Teflon.

* * * * *